United States Patent
Au-Yeung et al.

(10) Patent No.: US 8,123,843 B2
(45) Date of Patent: Feb. 28, 2012

(54) RICH GAS ABSORPTION APPARATUS AND METHOD

(75) Inventors: Patrick H. Au-Yeung, Midland, MI (US); Dennis W. Jewell, Angleton, TX (US); John G. Pendergast, Jr., Lake Jackson, TX (US)

(73) Assignee: Dow Global Technologies LLC

(*) Notice: Subject to any disclaimer, the term of this patent is extended or adjusted under 35 U.S.C. 154(b) by 442 days.

(21) Appl. No.: 12/249,264

(22) Filed: Oct. 10, 2008

(65) Prior Publication Data

US 2009/0104099 A1    Apr. 23, 2009

Related U.S. Application Data

(60) Provisional application No. 60/980,552, filed on Oct. 17, 2007.

(51) Int. Cl.
B01D 47/14 (2006.01)

(52) U.S. Cl. ............... 96/244; 95/199; 95/211; 96/262; 96/265; 96/290

(58) Field of Classification Search ............ 423/238, 423/240 S, 244.01, 239.1, 210; 422/88, 140; 95/199, 211; 96/290, 244, 265, 262
See application file for complete search history.

(56) References Cited

U.S. PATENT DOCUMENTS

| | | | | |
|---|---|---|---|---|
| 2,081,339 A * | 5/1937 | Rue et al. | ...................... | 422/291 |
| 3,646,874 A * | 3/1972 | Hamerski | ..................... | 454/182 |
| 3,739,551 A * | 6/1973 | Eckert | ............................. | 95/211 |
| 3,793,171 A * | 2/1974 | Zabolotny et al. | .............. | 95/187 |
| 4,153,432 A * | 5/1979 | Beman et al. | ................... | 95/214 |
| 4,550,012 A * | 10/1985 | Penick | ......................... | 422/106 |
| 4,578,093 A * | 3/1986 | Cheng et al. | ..................... | 62/637 |
| 4,678,654 A * | 7/1987 | Holmstrom et al. | ......... | 423/478 |
| 5,302,361 A * | 4/1994 | Nagl | ............................. | 423/220 |
| 5,393,314 A | 2/1995 | Powell et al. | | |
| 5,518,696 A | 5/1996 | Jain | | |
| 5,876,662 A * | 3/1999 | Jain | ................................ | 422/12 |
| 6,174,498 B1 * | 1/2001 | Jain et al. | ...................... | 422/122 |
| 6,511,641 B2 * | 1/2003 | Herman et al. | ............... | 423/210 |
| 6,521,200 B1 * | 2/2003 | Silveston et al. | ......... | 423/512.1 |
| 6,759,018 B1 * | 7/2004 | Arno et al. | .................... | 423/210 |
| 7,138,096 B2 * | 11/2006 | Moore et al. | .................. | 423/210 |
| 2006/0185517 A1 * | 8/2006 | Nagel | ............................ | 96/275 |
| 2007/0212288 A1 * | 9/2007 | Holst et al. | ............... | 423/240 R |
| 2008/0003157 A1 * | 1/2008 | Raoux et al. | .............. | 423/239.1 |
| 2009/0028767 A1 * | 1/2009 | Parker et al. | .................. | 423/235 |

FOREIGN PATENT DOCUMENTS

WO    WO 93/08899    5/1993

OTHER PUBLICATIONS

US 5,620,653, 04/1997, Jain et al. (withdrawn)

* cited by examiner

*Primary Examiner* — Duane Smith
*Assistant Examiner* — Ives Wu

(57) ABSTRACT

The present invention relates to an apparatus comprising a co-current absorbing unit, a countercurrent absorbing unit, at least one absorbing liquid reservoir, and at least one liquid transferring means. The invention also relates to a method of absorbing a reactive gas and a method of preparing a solution by contacting a reactive gas to a solvent and allowing the reactive gas to react with the solvent.

14 Claims, 5 Drawing Sheets

RICH GAS ABSORPTION APPARATUS AND METHOD

CROSS-REFERENCE TO RELATED APPLICATIONS

This application claims benefit of U.S. Provisional Patent Application No. 60/980,552, filed Oct. 17, 2007, which is hereby incorporated by reference in its entirety.

The present invention generally relates to an apparatus for and a method of absorbing a reactive gas. The invention also relates to a method of preparing a solution by contacting a reactive gas to a solvent and allowing the reactive gas to react with the solvent.

BACKGROUND OF THE INVENTION

Periodically human health and lives are threatened by a breach of containment and accidental release of a reactive gas from an industrial source. Gas absorbing apparatuses known as emergency gas scrubbers are used in diverse industries such as chemicals, paper making, and water treatment to contain a sudden release of lethal and corrosive quantities of a reactive gas such as chlorine, hydrogen chloride, ammonia, phosgene, sulfur dioxide ($SO_2$), sulfur trioxide ($SO_3$), and nitric oxide ($NO_3$).

Unfortunately, large quantities of a reactive gas can be released in an industrial accident. For example, cylinders containing 2,300 pounds of liquefied chlorine are used in some industrial processes. Similarly, hundreds of pounds each of hydrogen chloride, ammonia, phosgene, sulfur dioxide ($SO_2$), sulfur trioxide ($SO_3$), or nitric oxide ($NO_3$) are stored and used in industry. The accidentally released reactive gas typically mixes with ambient air to form a rich reactive gas mixture (i.e., rich gas).

In order to absorb a large quantity of a reactive gas that can be discharged in an industrial accident, skilled artisans try various emergency gas scrubber designs and find them to be ineffective and inefficient. For example, scrubber designs suitable for removing relatively small concentrations of slow reacting gases (e.g., for odor control) are not effective at absorbing large amounts of a reactive gas released at a relatively high concentration. To boost scrubbing effectiveness, some emergency gas scrubbers are combined with recycling systems. One frightening combination involves recycling a reactive gas through a scrubber and back to its storage area, where people and equipment are in close proximity and vulnerable to the gas's lethal and corrosive effects.

Other emergency gas scrubber designs place an ejector venturi over a scrubbing tank containing a scrubbing liquid. The venturi is connected via a pipe to a source of scrubbing liquid and to a gas storage room containing a stored reactive gas. Upon accidental release of the reactive gas into the storage room, a scrubbing liquid is downwardly injected under high pressure through the venturi into the scrubbing tank, thereby creating a vacuum in the pipe to the gas storage room. The gas in the gas storage room is drawn through the pipe and into the venturi, where it mixes with the scrubbing liquid. The gas and scrubbing liquid pass downwardly through the venturi in a co-current flow and into the scrubbing tank, where an unabsorbed gas and liquid separate. Then the scrubbing tank releases the unabsorbed gas through an outlet. Ejector venturi designs, however, are not without flaws.

For example, U.S. Pat. No. 5,518,696 alleges that in an emergency, ejector venturi gas scrubbers absorb only about 70% by weight to 80% by weight of an accidentally released amount of a reactive gas. To absorb unabsorbed reactive gas that the venturi ejector allegedly misses, a packed tower is added downstream from the ejector venturi. To absorb a sufficient amount of the reactive gas, however, the packed tower must be undesirably large in size such that an amount of packing material in the oversized tower is substantially larger than an amount theoretically needed to absorb all of the reactive gas. For example, removing chlorine having an initial concentration (i.e., concentration prior to entering an 80% efficient venturi ejector) of 800,000 parts per million would require a tower height exceeding 3.35 meters.

Thus, U.S. Pat. No. 5,518,696 mentions an alternative once-through, multi-unit emergency gas scrubber design that uses a series of three serially connected chambers having a plurality of spray nozzles that, unlike a venturi's flow pattern, spray a scrubbing liquid countercurrent to a flow of reactive gas through the chambers. The reactive gas then passes from the last chamber to a bed that has been wetted with a scrubbing liquid. As in the chambers, the gas and the scrubbing liquid flow in opposite directions or countercurrently in the wetted bed. Unabsorbed gas then exits through a vent stack to the earth's atmosphere. The design requires three countercurrent chambers and a wetted countercurrent bed.

Not surprisingly, therefore, conventional once-through emergency gas scrubbers typically contain multiple packing sections and are built oversized compared to what is theoretically required to neutralize an anticipated amount of a reactive gas. The scrubbers are made of expensive corrosion-resistant metal such as titanium, metal alloys such as HASTELLOY® (Haynes International, Inc.) alloys, or non-metals such as fiberglass reinforced plastics. Oversized units use large amounts of the expensive corrosion-resistant metals, metal alloys, or non-metals and their use is problematic in situations where construction budgets, space, or both is limited. Heretofore in some conventional applications, scrubber towers of more than 8 meters total height are designed.

Efficient and effective functioning of a reactive gas absorbing apparatus (e.g., scrubber) is directly related to the apparatus' design and efficient, smaller, and less expensive reactive gas apparatuses are needed. Ideally, the apparatus would be designed to minimize sizes of absorbing units and reduce numbers of the units employed. In an emergency, the apparatus would rapidly absorb a majority of an amount of a reactive gas without being hydraulically flooded by the reactive gas. Such an apparatus would be useful for scrubbing corrosive and lethal amounts of reactive gases in a health and safety setting and for preparing solutions (e.g., reagent solutions) by contacting a reactive gas to, and allowing the reactive gas to react with, a solvent in a manufacturing setting.

BRIEF SUMMARY OF THE INVENTION

The present invention relates to an apparatus comprising a co-current absorbing unit, a countercurrent absorbing unit, at least one absorbing liquid reservoir, and at least one liquid transferring means. The invention also relates to a method of absorbing a reactive gas and a method of preparing a solution by contacting a reactive gas to a solvent and allowing the reactive gas to react with the solvent. Sizes of packed beds in the two absorbing units are less than half the sizes of packed beds in corresponding conventional units for a same anticipated amount of a reactive gas and the invention apparatus cannot be hydraulically flooded by the reactive gas. The significantly smaller sizes of the two invention absorbing units are made possible by their arrangement in a series as a co-current absorbing unit, which cannot be hydraulically flooded by the reactive gas, followed by a countercurrent absorbing unit such that the reactive gas first contacts an absorbing liquid at a packed bed of the co-current absorbing unit before any unabsorbed portion of the reactive gas contacts an absorbing liquid at a packed bed of the countercurrent absorbing unit.

In a first embodiment, the invention is an apparatus comprising:
(a) a co-current absorbing unit comprising:
 (i) a first packed bed, which is in selective fluid communication with a source of a first absorbing liquid;
 (ii) a first sealed housing, which contains the first packed bed;
 (iii) a rich gas inlet, which traverses the first sealed housing and is in fluid communication with the first packed bed and is in selective fluid communication with a source of a reactive gas; and
 (iv) an unabsorbed gas outlet, which traverses the first sealed housing and is in fluid communication with the first packed bed;
(b) a countercurrent absorbing unit comprising:
 (i) a second packed bed;
 (ii) a second sealed housing, which contains the second packed bed;
 (iii) an unabsorbed gas inlet, which traverses the second sealed housing and is in fluid communication with the unabsorbed gas outlet and the second packed bed;
 (iv) a clean gas outlet, which traverses the second sealed housing and is in fluid communication with the second packed bed and is in selective fluid communication with earth's atmosphere;
 (v) a second absorbing liquid inlet, which traverses the second sealed housing and is in fluid communication with the second packed bed and is in selective fluid communication with a source of a second absorbing liquid; and
 (vi) a second absorbing liquid outlet, which traverses the second sealed housing and is in fluid communication with the second packed bed and the first absorbing liquid inlet, or is in fluid communication with the second packed bed and is in selective fluid communication with an absorbing liquid reservoir or a waste liquid conduit;
(c) a first absorbing liquid reservoir comprising:
 (i) a first sealed tank;
 (ii) a first optionally-valved absorbing liquid outlet, which traverses the first sealed tank and is in fluid communication with the first absorbing liquid inlet; and
 (iii) a first pressure-adjusting gas inlet, which traverses the first sealed tank and is in selective fluid communication with a first pressure-adjusting gas source; and
(d) a first liquid transferring means, which is in fluid communication with the first optionally-valved absorbing liquid outlet and the first absorbing liquid inlet;
wherein, optionally, the first and second sealed housings are in direct communication with each other and comprise one contiguous housing comprised of the first and second sealed housings.

A second embodiment is a process comprising the steps of: providing an apparatus according to the first embodiment; providing first and second absorbing liquids in fluid communication with the first and second packed beds, respectively; providing an amount of a reactive gas in fluid communication with the rich gas inlet; and contacting the reactive gas with the first and second absorbing liquids at the first and second packed beds, respectively, wherein the reactive gas reacts with the first absorbing liquid to form a first solution and the reactive gas reacts with the second absorbing liquid to form a second solution, wherein the first and second solutions are kept separate and distinct from each other or are mixed together to become the same.

A third embodiment is a method comprising the steps of:
 providing an apparatus according to the first embodiment, the apparatus further comprising a sensing means in activating communication with the first liquid transferring means;
 providing first and second absorbing liquids in fluid communication with the first and second packed beds, respectively;
 providing an amount of a reactive gas in fluid communication with the rich gas inlet and the sensing means;
 sensing a presence of the reactive gas and activating the first liquid transferring means; and
 contacting the reactive gas with the first and second absorbing liquids at the first and second packed beds, respectively, until at least 99.9% by weight of the amount of the reactive gas has been absorbed in the first and second absorbing liquids.

Additional embodiments are described in accompanying drawings and the remainder of the specification.

DETAILED DESCRIPTION OF THE INVENTION

Figure 1:
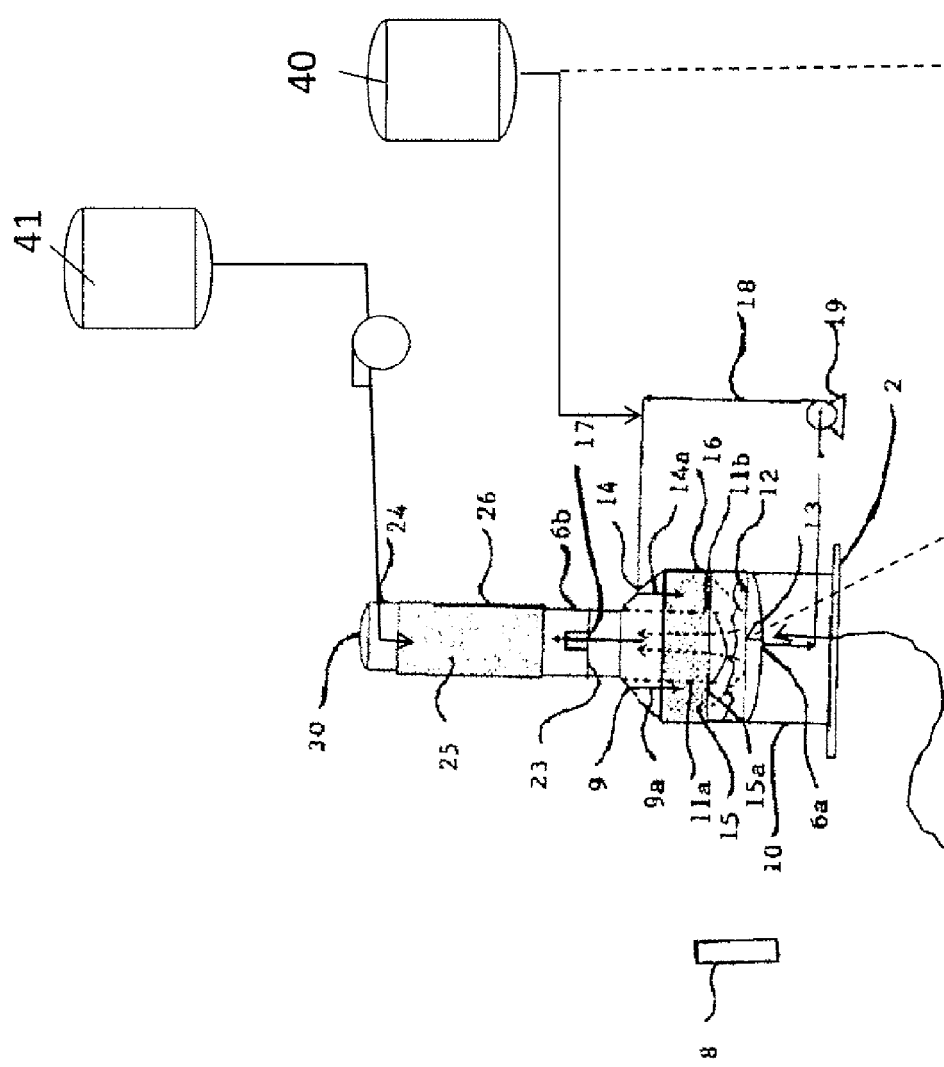
FIG. 1 illustrates an embodiment of the invention apparatus comprising a co-current reactive gas absorbing unit in communication with a countercurrent reactive gas absorbing unit.

The present invention is described above and further described below. In describing the invention, certain abbreviations, phrases, terms, and words are used that are defined here. When interpreting a meaning of an abbreviation, phrase, term, or word, its definition here governs unless, for a particular use, a different meaning is stated elsewhere in this specification or unless a context of the use of the abbreviation, phrase, term, or word clearly indicates a different meaning is intended from definitions provided here.

Highlighted Abbreviations cm—centimeter(s)
mL—milliliter(s)
mm—millimeter(s)
min.—minute(s)
M—molar
%—percent
sccm—standard cubic centimeters per minute Articles "a" and "the" refer to singular and plural forms of what is being modified by the articles. When used in front of a first member of a list of two or more members, "a" or "the" independently refer to each member in the list. The term "or" refers to members in a list either singly or in any combination.

The term "comprising," which is synonymous with the terms "including," "containing," "having," and "characterized by," is inclusive or open-ended. Likewise, the term "group of" is also open-ended. These terms do not exclude additional elements, materials, ingredients, or method steps, including unrecited ones, even if the additional elements, materials, ingredients, or method steps are present in major amounts. When the term "comprising" is used as a transition from a claim's preamble to the claim's body (i.e., as a transitional term), the entire claim is open-ended.

The phrases "consisting of" or "group consisting of" are closed terms. These phrases exclude any element, step, or ingredient not specified. When the phrase "consisting of" is used as a transitional phrase in a claim, the phrase closes the claim to the inclusion of materials, elements, or steps that are not specifically recited in the claim except for impurities ordinarily associated therewith and materials, elements or steps that are unrelated to the claimed invention. When the phrase "consisting of" is used in a clause of the body of the claim rather than immediately following the preamble, it limits only the element, step, or material set forth in that clause and other elements, materials, or steps outside of the clause are not excluded from the claim. The present invention also includes embodiments written by modifying the "comprising" embodiments described elsewhere herein by replacing the transitional term "comprising" with the transitional phrase "consisting of."

The phrase "consisting essentially of" may be used in a claim's preamble to limit the scope of the claim to the specified materials, elements, or steps and those that do not materially affect the basic and novel characteristic or characteristics of the claimed invention. Referring to preambles, a "consisting essentially of" claim occupies a middle ground between closed claims that are written in "consisting of" format and fully open claims that are drafted in a "comprising" format. The present invention also includes embodiments written by modifying the "comprising" embodiments described elsewhere herein by replacing the transitional term "comprising" with the transitional phrase "consisting essentially of."

An embodiment of an invention apparatus comprising a contiguous housing comprised of a first housing in communication with a second housing is illustrated in FIG. 1. Referring to FIG. 1, an invention apparatus 10 and a reactive gas source 8 are housed in a sealed chamber or room (not shown). The invention apparatus 10 is comprised of second sealed housing 26 containing a counter-current second packed bed 25 disposed over, and in direct communication with first sealed housing 16 containing a co-current first packed bed 15. A reactive gas source 8 supplies a reactive gas (not shown), which may be drawn from the reactive gas source 8 by path 8a into rich gas inlet 9 and through the invention apparatus 10 by an electric fan (not shown) interposed between clean gas outlet 30 and a clean gas vent (not shown). Thus, the reactive gas is drawn into the first sealed housing 16 via the rich gas inlet 9, from which the reactive gas co-currently flows with a first absorbing liquid 12, which enters sealed housing 16 via first absorbing liquid inlet 14, in a downward direction indicated by arrows 9a and 14a into and through the first packed bed 15. The reactive gas and the first absorbing liquid 12 are co-currently directed downward through the first packed bed 15 by back pressures of further incoming reactive gas and first absorbing liquid 12. The reactive gas is prevented from exiting unabsorbed gas outlet 17 by a vertical partition having cylindrical wall indicated by 11a and 11b. The reactive gas and first absorbing liquid 12 flow through the first packed bed 15 outside of the cylindrical wall indicated by 11a and 11b and exit the first packed bed 15 at bottom face 15a. The first absorbing liquid 12 is then collected by bottom face 13 of the first sealed housing 16. The bottom face 13 contains a reserve of the first absorbing liquid 12, which is sequentially circulated out of a first absorbing liquid outlet 6a via path 18 by a first pump 19 into the first sealed housing 16 via first absorbing liquid inlet 14. Unabsorbed reactive gas (not shown) that has exited the bottom face 15a of the first packed bed 15 separates from the first absorbing liquid 12 and flows upward through a center portion of the first packed bed 15, which center portion is inside the cylindrical wall indicated by 11a and 11b, and exits the first sealed housing 16 via the unabsorbed gas outlet 17. The unabsorbed reactive gas flows upwardly through a second packed bed 25, which is wetted by a second absorbing liquid (not shown) that is pumped in a one-pass mode into a second absorbing liquid inlet 24 by a second pump (not shown). The second absorbing liquid flows downwardly through second packed bed 25 in a direction that is countercurrent to the upward flow direction through second packed bed 25 of the unabsorbed reactive gas. The second absorbing liquid exits the second packed bed 25 and is collected by a bottom face 23 of the second sealed housing 26. (The bottom face 23 of the second sealed housing 26 is also a top face 23 of the first sealed housing 16.) The second absorbing liquid exits the second sealed housing 26 via second absorbing liquid outlet 6b, from which the second absorbing liquid is directed to a first waste conduit (not shown). A clean gas (not shown) exits the invention apparatus 10 via clean gas outlet 30 to a clean gas vent (not shown), which directs the clean gas into the earth's atmosphere.

The terms "rich reactive gas mixture," "rich reactive gas," and "rich gas" are synonymous and refer to a composition comprised of from 25% by weight to 100% by weight of a reactive gas to total weight of the rich reactive gas mixture, as measured using an Agilent® (Agilent Technologies, Inc., Santa Clara, Calif., USA) 5000A Real-Time Gas Analyzer, which is available from Diablo Analytical, Concord, Calif., USA. In some embodiments, a rich gas is comprised of at least 40% by weight of a reactive gas. In other embodiments, the mixture is comprised of at least 50% by weight; at least 75% by weight; or at least 90% by weight of the reactive gas. In some embodiments of the invention process, the reactive gas is HCl, ammonia, sulfur trioxide, sulfur dioxide, or nitric oxide.

An "amount of a reactive gas" is any amount that may enter a rich gas outlet of an invention apparatus such that less than 1.0% by weight (as measured by the Agilent® 5000A Real-Time Gas Analyzer) of the amount exits a clean gas outlet as unabsorbed reactive gas. In some embodiments, the amount of unabsorbed reactive gas that exits a clean gas outlet is <0.1% by weight; <0.01% by weight; or <0.001% by weight.

A reactive gas may react reversibly or irreversibly with an absorbing liquid. The term "reactive gas" is characterized as a substance that has a boiling point below 20° C. and that reversibly or irreversibly reacts with a 10 mole excess of an absorbing liquid after contact to the absorbing liquid, to form an equilibrium mixture wherein at least 95 mole % of the reactive gas has reacted, wherein the absorbing liquid is either pH 7.0 water (distilled), 1.0 M aqueous sulfuric acid solution, or 1.0 M aqueous sodium hydroxide solution. Examples of reversible reactions of a reactive gas and an absorbing liquid include acid-base proton exchange or transfer reactions such as reaction of HCl gas with a 10 mole excess of 1.0 M aqueous sodium hydroxide to form an equilibrium mixture comprising NaCl in aqueous sodium hydroxide, wherein >95% by weight of the Cl from the HCl is reacted to form the NaCl. Examples of irreversible reactions of a reactive gas and an absorbing liquid include reaction of phosgene (i.e., C(O)Cl$_2$) with a 10 mole excess of pH 7.0 water to form CO$_2$ gas, which may then irreversibly bubble off, and an equilibrium mixture comprising about 0.1 M aqueous hydrochloric acid. Examples of reactive gases are ammonia; organic amines having boiling points below 20° C. such as, for example, methylamine and dimethylamine; chlorine; hydrogen chloride; phosgene; sulfur dioxide; sulfur trioxide; and nitric oxide. A reactive gas absorbed in an absorbing liquid will typically produce a mixture having a vapor pressure at or below 0.26 atmospheres (i.e., at or below 200 mm Hg) when measured at 20° C. and atmospheric pressure. In some embodiments, the reactive gas in a rich reactive gas mixture is ammonia, chlorine, hydrogen chloride, phosgene, sulfur dioxide, sulfur trioxide, or nitric oxide.

A "source of a reactive gas" includes, for example, a gas cylinder, a reactor having a chemical reaction that generates a reactive gas, a storage room containing the gas cylinder or a manufacturing room containing the reactor.

The term "absorbing liquid" refers to a fluid that is at least 99% by weight in a liquid phase at 25° C. and is useful for absorbing a reactive gas. The absorbing liquid is a solvent or a solution comprising a solvent and is capable of being moved through a conduit (e.g., a pipe) by conventional liquid handling means such as a pump, pressurized gas-induced flow means, or gravity-induced flow means. An absorbing liquid may have a neutral, acidic, or basic pH. Examples of absorbing liquids are water, a pH acidic aqueous solution such as a solution of a non-volatile acid in water, and a pH basic aqueous solution such as a solution of a metal hydroxide or metal carbonate in water. Examples of non-volatile acids are sulfuric acid and phosphoric acid. The metal of the metal hydroxide or metal carbonate is a cation of an element from Group 1 or 2 of a Periodic Table of the Elements. Examples of metal hydroxides are sodium hydroxide, potassium hydroxide, and calcium hydroxide. An example of a metal carbonate is sodium carbonate, potassium carbonate, and calcium carbonate. Other hydroxides and carbonates of cations of Group 1 or 2 metals are contemplated. A pH neutral absorbing liquid may be used for absorbing any reactive gas. A pH acidic absorbing liquid is used for absorbing pH basic or pH neutral reactive gases. A pH acidic absorbing liquid may be used, for example, to absorb ammonia, methylamine, and dimethylamine. A pH basic absorbing liquid is used for absorbing pH acidic or pH neutral reactive gases. A pH basic absorbing liquid may be used, for example, to absorb chlorine, hydrogen chloride, phosgene, sulfur dioxide, sulfur trioxide, and nitric oxide. The phrase "pH of a reactive gas" refers to a pH of a solution formed by dissolving 0.010 mole or more of the reactive gas in 1.0 liter of distilled pH 7.0 water, wherein some reactive gases may undergo reversible or irreversible reactions with the water to produce an acidic or basic solution. In some embodiments, a first absorbing liquid and a second absorbing liquid are the same. In other embodiments, the first and second absorbing liquids are separate and distinct. In other embodiments, the first and second absorbing liquids are comprised of water.

A "source of a first absorbing liquid" includes, for example, a first sealed housing, first sealed tank 40, and a second sealed tank. A "source of a second absorbing liquid" includes, for example, a second sealed housing (e.g., wherein a first absorbing fluid outlet is closed by an optional valve to prevent draining) and first sealed tank. An absorbing liquid may also be obtained from a utility source (e.g., a utility water pipe or water tower), bottle, drum, or rail tank car. Alternatively, the absorbing liquid may be prepared ahead of time by conventional methods or prepared in situ in the invention apparatus (e.g., by diluting a concentrated solution of sulfuric acid in water). To ready an invention apparatus for operation, a sealed housing or sealed tank may be pre-operatively charged with an absorbing liquid through an absorbing liquid inlet or outlet as described herein or through a separate and distinct absorbing liquid inlet that traverses the sealed housing or sealed tank and is used chiefly for pre-operative charging purposes. Alternatively, the sealed housing or sealed tank may be charged after initiating operation of the invention apparatus such as, for example, in response to a signal from a sensing means.

An "absorbing liquid reservoir" refers to a conventional assembly that includes a sealed tank as described herein. A sealed tank is typically comprised of a corrosion resistant material that is capable of containing an absorbing liquid until it Is needed in an invention method. Examples of such tanks include carboys and steel drums. In some embodiments, the apparatus of the first embodiment further comprises a second absorbing liquid reservoir comprising:

(i) a second sealed tank 41;
(ii) a second optionally-valved absorbing liquid outlet, which traverses the second sealed tank and is in fluid communication with a second absorbing liquid inlet;
(iii) a second pressure-adjusting gas inlet, which traverses the second sealed tank and is in selective fluid communication with a second pressure-adjusting gas source; and
(iv) optionally, a third absorbing liquid inlet, which traverses the second sealed tank and is in fluid communication with a second absorbing liquid outlet or is in selective fluid communication with a source of the first absorbing liquid;

wherein the first and second pressure-adjusting gas sources may be the same or different. In some embodiments, a first absorbing liquid reservoir further comprises a fourth absorbing liquid inlet 42, which traverses a first sealed tank and is in fluid communication with a first absorbing liquid outlet. In some embodiments, there is a first absorbing liquid contained within the first sealed housing and in fluid communication with a first packed bed, or, optionally, there is a first absorbing liquid contained within a second sealed tank and in fluid communication with the first packed bed; and there is a second absorbing liquid contained within the first sealed tank and in fluid communication with a second packed bed, wherein the first and second absorbing liquids may be the same or different, wherein if the first and second absorbing liquids are the same, then independently first and second absorbing liquid reservoirs may be the same or different and first and second liquid transferring means may be the same or different.

The phrase "co-current absorbing unit" refers to an assembly comprising a packed bed for absorbing a reactive gas in an absorbing liquid that is in direct physical contact with the packed bed wherein a direction of flow of the reactive gas across or through the packed bed that is wetted with the absorbing liquid is in the same direction as a direction of flow of the absorbing liquid across or through the packed bed. In contrast, a "countercurrent absorbing unit" is an assembly comprising another packed bed wherein a direction of flow of a reactive gas across or through the other packed bed is essentially from an opposite direction to a perpendicular direction to a direction of flow of the absorbing liquid across or through the other packed bed.

Without being bound by a theory, the invention's serial arrangement of first a co-current absorbing unit, which comprises a first packed bed, followed second by countercurrent absorbing unit, which independently comprises a second packed bed is highly efficient in absorbing into absorbing liquids contained therein, and in respective contact with the first and second packed beds, the reactive gas from a rich reactive gas mixture without being hydraulically flooded by the reactive gas. Features of the invention apparatus include a lower number of absorbing units than conventionally used in a particular application, e.g., only two absorbing units where a conventional application employs three, four, or more absorbing units. Another feature of the invention is an independent and substantial reduction of sizes of the first and second packed beds as compared to the conventional size of a packed bed in a conventional reactive gas scrubber tower. For example, instead of a 5-meter height packing in a single (oversized) tower of a conventional vertical scrubber, the first and second packed beds of the co-current and countercurrent absorbing units may independently each comprise one 0.5-meter height of packed bed for a combined total height of 1-meter. Reference to a "conventional reactive gas scrubber" does not imply any particular number of towers, direction of current flow of a reactive gas and absorbing liquid in a conventional tower, or an arrangement of two or more such conventional towers. Comparison of packed bed heights is for illustration purposes and does not limit the invention to having a vertical co-current or countercurrent flow of absorbing liquid and reactive gas through and around the first and second packed beds of the co-current and countercurrent units, respectively. Co-current or countercurrent flow direction of the absorbing liquid and reactive gas in the invention apparatus may also be horizontal across and through the first and second packed beds, or vertical through and around one of the first and second packed beds and horizontal through and across the other of the first and second packed beds.

Thus in all embodiments, the first absorbing unit of an invention apparatus to encounter any rich reactive gas mixture is a co-current absorbing unit as described herein. In an invention apparatus, a size of a first packed bed of a co-current absorbing unit is less than half of a typical size of a packed bed in a conventional prior art absorbing unit for a particular initial amount of a reactive gas. The co-current absorbing unit absorbs a majority of an amount of a reactive gas in a rich reactive gas mixture without being hydraulically flooded by the reactive gas. Any unabsorbed reactive gas exiting the co-current unit enters a countercurrent absorbing unit comprising a second packed bed. Because the invention is based, in part, on a discovery that a substantial proportion of the reactive gas is absorbed in the co-current absorbing unit, the second packed bed also can be less than half of the size of packed beds in conventional absorbing units and still the countercurrent absorbing unit cannot be hydraulically flooded by the reactive gas. In some embodiments, the second packed bed is sized for absorbing 20% by weight or less of the particular initial amount of the reactive gas. In other embodiments, the second packed bed is sized for absorbing 10% by weight or less, 5% by weight or less, or 2% by weight or less of the particular initial amount of the reactive gas.

Portions of an invention apparatus that may be in fluid communication with a reactive gas, an absorbing liquid, or both, ideally are comprised of a corrosion-resistant material. Corrosion-resistant materials refer to conventional materials suitable for their intended uses from a chemical reactivity and structural strength perspective. Examples of known corrosion-resistant materials include metals such as titanium and stainless steel, metal alloys such as HASTELLOY® (Haynes International, Inc.) alloys, or non-metals such as fiberglass reinforced plastics, polyetheretherketone (PEEK), polytetrafluoroethylene (PTFE), fluoroelastomer, and perfluoroelastomer (PFE). The PEEK, PTFE, fluoroelastomer, and PFE may be used, for example, on a stand alone basis such as when comprising a liquid pump diaphragm, in conjunction with a reinforcing material such as fiberglass in a container wall, or as a coating or lining on a non-corrosion resistant material such as, for example, copper and non-stainless steel.

A reactive gas, absorbing liquid, pressure-adjusting gas, or a combination thereof, passes in to or out of a component if an invention apparatus via an inlet or outlet. Inlets and outlets are conduits allowing through passage of a liquid, gas, or both, as circumstances indicate, into or out of an apparatus such as a sealed housing or sealed tank. Passage may be in through or out through either an inlet or outlet. Passage may be in a one-way flow direction (e.g., a check valve may prevent backflow) or in a two-way flow direction and the terms "inlet" and "outlet" are not necessarily limiting of a direction of passage. Any inlet or outlet may independently contain an optional adjustable valve for controlling a flow of a liquid or gas through the inlet or outlet. In some embodiments, the inlets allow one-way direction of flow in and the outlets allow one-way direction of flow out. In other embodiments, each direction of flow is two-way. An "unabsorbed gas outlet" is a gas conduit for allowing through passage of an unabsorbed portion of a reactive gas exiting an absorbing unit. An "unabsorbed gas inlet" is a gas conduit for allowing through passage of the unabsorbed portion of a reactive gas entering an absorbing unit. When a gas or liquid inlet or outlet traverses a sealed housing or a sealed tank, the gas or liquid inlet or outlet is in fluid communication with, among other things, an inside of the sealed housing or sealed tank. A "clean gas outlet" is a gas conduit for allowing a gas that is substantially free of reactive gas to exit a last absorbing unit of an invention apparatus, to, ultimately, earth's atmosphere. The clean gas outlet may be in (selective) fluid communication with the earth's atmosphere such as via a connection to a clean gas vent (e.g., a duct, pipe, or stack) that is positioned for conventionally releasing a clean gas into the earth's atmosphere. In some embodiments, the clean gas outlet comprises a clean gas vent. Examples of gas conduits are vents, pipes, and ducts.

Inlets and outlets are dimensioned for sealably connecting to a hole in a housing or tank. Inlets and outlets include valved and non-valved conduits, wherein valves may be adjustable or non-adjustable. An "optionally-valved absorbing liquid outlet" refers to an outlet as described above and optionally having a valve for controlling a flow of an absorbing liquid or gas through the outlet, including stopping the flow. Such a valve may be adjustable to control a rate of the flow of the absorbing liquid, gas, or both. In some embodiments, an inlet or outlet does not have an adjustable valve. In other embodiments, an inlet or outlet has an adjustable valve. A "pressure-adjusting gas inlet" refers to a one-way flow or two-way flow conduit that allows pressure within a sealed tank, for example, to equalize with pressure outside the sealed tank in response to absorbing liquid entering or exiting the sealed tank. A pressure-adjusting gas is essentially chemically inert to a reactive gas and absorbing liquid. Examples of a "pressure-adjusting gas source" are the earth's atmosphere and a pressurized gas cylinder. Examples of pressure-adjusting gas are air, nitrogen, argon, and helium. In some embodiments, a co-current absorbing unit further comprises a second absorbing liquid inlet and a second absorbing liquid outlet, each of which traverses a first sealed housing and is in fluid communication with a first packed bed, wherein the second absorbing liquid inlet is in fluid communication with the second absorbing liquid outlet or the second absorbing liquid inlet is in selective fluid communication with a source of a first absorbing liquid; and the second absorbing liquid outlet is in fluid communication with the second absorbing liquid inlet (as just stated) or the second absorbing liquid outlet is in selective fluid communication with a waste liquid conduit.

A "liquid transferring means" refers to any conventional apparatus or method for moving liquid, for example, through a conduit (e.g., piping) or into or out of tanks. Examples of liquid transferring means are an electrical motor-containing liquid handling pump, a pressurized gas-induced flow means, and a gravity-induced flow means. Pumps include analog and digital pumps, variable speed and constant speed pumps. Ideally a pump will have a diaphragm comprised of a chemically-resistant material. A first liquid transferring means transfers a second absorbing liquid from a first absorbing liquid reservoir sequentially through a first optionally-valved absorbing liquid outlet and a first absorbing liquid inlet to a second packed bed. A second liquid transferring means recyclably transfers a first absorbing liquid from a second sealed tank sequentially through a second optionally-valved absorbing liquid outlet and a second absorbing liquid inlet to a first packed bed. A third liquid transferring means transfers a first absorbing liquid from a first packed bed sequentially through a second absorbing liquid outlet and either: through a second absorbing liquid inlet to the first packed bed (e.g., in a recycling operation), through a third absorbing liquid inlet into a second sealed tank, or to an optional first waste liquid conduit. A fourth liquid transferring means transfers a second absorbing liquid from a second packed bed out through a first absorbing liquid outlet and either: through a first absorbing liquid inlet to the second packed bed (e.g., in a recycling operation), through a fourth absorbing liquid inlet into a first sealed tank, or to an optional second waste liquid conduit. The first and second waste liquid conduits may be the same or different. The first and fourth liquid transferring means may be the same or different. The second and third liquid transferring means may be the same or different.

In some embodiments, the apparatus of the first embodiment further comprises a second liquid transferring means, which is in communication with a second optionally-valved absorbing liquid outlet and a second absorbing liquid inlet. In still other embodiments, the apparatus still further comprises a third liquid transferring means, which is in fluid communication with a second absorbing liquid outlet and either the second absorbing liquid inlet or a third absorbing liquid inlet; or is in fluid communication with the second absorbing liquid outlet and is in selective fluid communication with an optional first waste liquid conduit, wherein the second and third liquid transferring means may be the same or different. In some embodiments, the apparatus further comprises a fourth liquid transferring means, which is in fluid communication with a first absorbing liquid outlet and either a first absorbing liquid inlet or an optional second waste liquid conduit, wherein first and fourth liquid transferring means may be the same or different and first and second waste liquid conduits may be the same or different. In some embodiments, the apparatus does further comprise a second absorbing liquid inlet, a second absorbing liquid outlet, a second absorbing liquid reservoir, and a second liquid transferring means.

In some embodiments of the invention apparatus, a packed bed is in selective fluid communication with an absorbing liquid. In other embodiments of the invention apparatus, a packed bed is in fluid communication with an absorbing liquid. In some embodiments of the invention apparatus, a packed bed is in selective fluid communication with a source of a reactive gas or a reactive gas. In other embodiments of the invention apparatus, a packed bed is in fluid communication with a source of a reactive gas or a reactive gas. Packed beds are commercially available or are readily prepared from conventional packing materials. Examples of packing materials that may comprise a packed bed are 0.4 cm diameter polyvinylidene fluoride rings and 0.635 cm diameter ceramic saddles. Packing materials are commercially available. Polyvinylidene fluoride (KYNAR®, Pennwalt Corporation, Philadelphia, Pa., USA) rings may be purchased from Pall Corporation, East Hills, N.Y., USA. Ceramic saddles (Intalox®, Koch-Glitsch, Limited Partnership, Wichita, Kans., USA) may be purchased from Koch-Glitsch, LP.

The term "partition" refers to a wall of a corrosion resistant material (as described previously) that enhances co-current reactive gas/absorbing liquid flow by preventing a reactive gas from exiting a sealed housing through a gas outlet without first co-currently passing with an absorbing liquid through a substantial portion of a packed bed. A partition is desirable when the reactive gas initially flows through a portion of a packed bed in a direction that is downward or horizontal before the reactive gas is allowed to rise, for example, through at least another part of the packed bed and exit a sealed housing via a gas outlet. An example of a design of a co-current absorbing unit without a partition is an overflow design wherein a first packed bed, which is not partitioned, comprises a top face and a bottom face, which is spaced apart from the top face. In operation of such an overflow design, a reactive gas and a first absorbing liquid each enter the bottom face of the first packed bed and flow upwardly through the first packed bed until the reactive gas and the first absorbing liquid overflow out of the top face of the first packed bed and unabsorbed reactive gas exits a sealed housing via an unabsorbed gas outlet, which may be conveniently located above the top face of the first packed bed. The first absorbing liquid overflows down an outside of the first packed bed to, for example, a reservoir, waste liquid conduit, holding tank, or pump. In some embodiments, a co-current absorbing unit further comprises a partition, which is in communication with a first sealed housing and a first packed bed and enhances a co-current flow of a reactive gas and a first absorbing liquid through the first packed bed. An example of a design of a co-current absorbing unit having a partition is illustrated as part of the embodiment of the invention apparatus of FIG. 1, which is described previously.

A "sealed housing" refers to a container comprised of a corrosion resistant material (as described previously) and that is capable of containing (i.e., holding or enclosing) a packed bed wetted with an absorbing liquid and a reactive gas without leaking (e.g., escaping through seams, gaps, and holes other than inlets and outlets) more than 0.1% by weight of an absorbing liquid or a reactive gas. The sealed housing may have inlets and outlets, as described herein, traversing the sealed housing to allow passage of the reactive gas or absorbing liquid from an inside of the sealed housing to an outside of the sealed housing. The sealed housing may further have other conventionally used inlets and outlets such as conduits for passage of electrical wire from the outside of the sealed housing to sensors located inside the sealed housing and portholes for visually inspecting an inside of the sealed housing or tank or sampling contents of the sealed housing or tank. The phrase "one contiguous housing comprised of the first and second housings" refers to an optional embodiment wherein first and second housings are directly attached to each other and form a unified structure. In some embodiments, a second sealed housing is positioned over and in direct communication with a first sealed housing and together the first and second sealed housings comprise one contiguous housing. In other embodiments, the first sealed housing is not in direct communication with the second sealed housing and the first and second sealed housings do not comprise one contiguous housing.

Examples of a "waste liquid conduit" are a pipe or trough, either of which allow an absorbing liquid to be moved or transported by a transferring means to a location where the absorbing liquid may be disposed of. Such locations include a waste water stream, underground injection well, and water treatment facility.

The phrase "in fluid communication" refers to engaging in, or currently being available for, one-way or two-way movement of a liquid, gas, or both, as circumstances indicate. The claims relate to the invention apparatus regardless of whether it is in an operating mode, operating-ready mode (e.g., connected to storage room having a source of a reactive gas and to a clean gas vent and having absorbing liquids in fluid communication with packed beds), or not in an operating or operating-ready mode such as, for example, when the invention apparatus is being transported or maintained. When referring to two elements (or components) of an invention apparatus, the phrase "in fluid communication" means one of the two elements is engaged in fluid communication, as defined above, with another of the two elements. The phrase "in selective fluid communication" means that one of the two elements is ready for being placed in fluid communication with the other of the two elements, e.g., the one element would be in fluid communication with the other element if the two elements were connected (directly or indirectly) to each other as described below. The former instance (i.e., where "in fluid communication" is used) includes embodiments wherein, for example, a rich gas inlet of the invention apparatus is connected to a source of a reactive gas and, thus, is in fluid communication with the source of a reactive gas. The latter instance (i.e., wherein "in selective fluid communication" is used) includes embodiments wherein, for example, a rich gas inlet is not currently connected to a source of a reactive gas and, thus, is not currently in fluid communication with a source of reactive gas, but is functionally ready for being connected to, and placed in fluid communication with, the source of a reactive gas. Fluid communication between two elements may be direct between the two elements (e.g., when the two elements are physically contacting each other in a functional manner) or indirect (i.e., when the two elements are not physically contacting each other but are connected in a functional manner via an intermediary element(s) such as a transferring means).

The term "activating communication" refers to a capability for allowing movement of a signal in a form of, for example, electricity or light from a sensing means to a transferring means, which is activated for transferring an absorbing liquid by the signal.

The phrase "in direct communication" refers to a direct (i.e., there is no intermediary element(s)) physical connection. The phrase "in indirect communication" refers to an indirect physical connection via an intermediary object. Examples of such intermediary objects are a pipe, transferring means, and wire. In some embodiments, a fluid communication, activating communication, or physical communication is direct. In other embodiments, such communication is indirect via one intermediary element of an invention apparatus.

The term "optionally" and "optional" refer to an element of the invention that is present, at a skilled artisan's discretion, in some embodiments of the invention, but not in other embodiments of the invention. If an optional element is present, related feature(s) of the embodiment such as, for example, "fluid communication" with the optional element are impliedly present as well.

Unless otherwise specified, each element or component of the invention apparatus is independently chosen without regard for a choice of any other element of the invention apparatus.

The words of "first," "second," etc., when used to distinguish embodiments, elements, or steps of the invention, do not imply any particular quantity, order or priority unless specifically stated otherwise. As mentioned elsewhere herein, an absorbing unit of the invention to first encounter a reactive gas is a co-current unit and then the second absorbing unit to encounter the reactive gas (i.e., that which is unabsorbed by the first unit) is a countercurrent unit.

The phrase "may be the same or different" is used in describing a relationship between certain elements of the invention, wherein the elements are one and identical or separate and distinct, respectively. For example, in the phrase "the first and fourth liquid transferring means may be the same or different," the expression "the same" means that the first and fourth liquid transferring means are actually a single liquid transferring means, for example, a single pump. The term "different" means that the first and fourth liquid transferring means are two discreet liquid transferring means, for example, two pumps, although the two pumps may be of the identical type, make, and model. When two absorbing liquids are the same, there is a single absorbing liquid, which simultaneously may be in (fluid) communication with two different packed beds, for example. When two absorbing liquids are different, they are two discreet liquids (i.e., volumes of liquids that are not in direct physical contact with each other, although the two discreet liquids could come into direct physical contact with each other during operation of an invention method or process and thereby become "the same"). "Different" absorbing liquids may or may not contain the same components or concentrations of same components.

Another embodiment comprises an invention apparatus according to the first embodiment, the apparatus further comprising a third absorbing unit in fluid communication with the countercurrent unit, wherein the third absorbing unit is a duplicate of the co-current absorbing unit or the countercurrent absorbing unit. In preferred embodiments, however, the invention apparatus does not comprise a third absorbing unit.

In some embodiments, the invention apparatus is useful as an emergency gas scrubber for absorbing at least 99.9% by weight of an initial amount of a reactive gas. In such embodiments, the apparatus further comprises a sensing means, which is in activating communication with a first liquid transferring means and in selective fluid communication with a source of a reactive gas. In some embodiments, the sensing means detects a reactive gas that is comprised of chlorine, hydrogen chloride, ammonia, phosgene, sulfur dioxide, sulfur trioxide, or nitric oxide. In some embodiments, the invention apparatus for use as an emergency gas scrubber further comprises one or two electric fans responsive to a signal from a signaling means and in communication with the signaling means and an unabsorbed gas outlet, clean gas outlet, or both. When operating, the fans draw a reactive gas from the storage or manufacturing room through the co-current absorbing unit, the countercurrent absorbing unit, or both. A first fan may be independently interposed between the unabsorbed gas outlet and the unabsorbed gas inlet; a second fan may be independently interposed between a clean gas outlet and a clean gas vent; or both the first and second fans may be interposed as described.

In some embodiments, the invention apparatus is useful in a manufacturing setting as a mixer for preparing a solution by contacting a reactive gas to a solvent and allowing the reactive gas to react with the solvent. An invention apparatus operating in a manufacturing process for preparing a solution ideally receives a controlled flow rate of a reactive gas. In some embodiments, the solution is comprised of HCl in water, ammonium hydroxide in water, sulfuric acid in water, sulfinic acid in water, or nitric acid in water, respectively. In the manufacturing setting, the invention apparatus also may further comprise a sensing means or one or two electric fans responsive to a signal from a signaling means and in communication with the signaling means and an unabsorbed gas outlet, clean gas outlet, or both.

An experiment is described below in Comparative Example 1 that led to a discovery.

COMPARATIVE EXAMPLE 1

A short packed bed tower provides high efficiency in absorbing a reactive gas from a rich reactive gas mixture.

Figure 2:
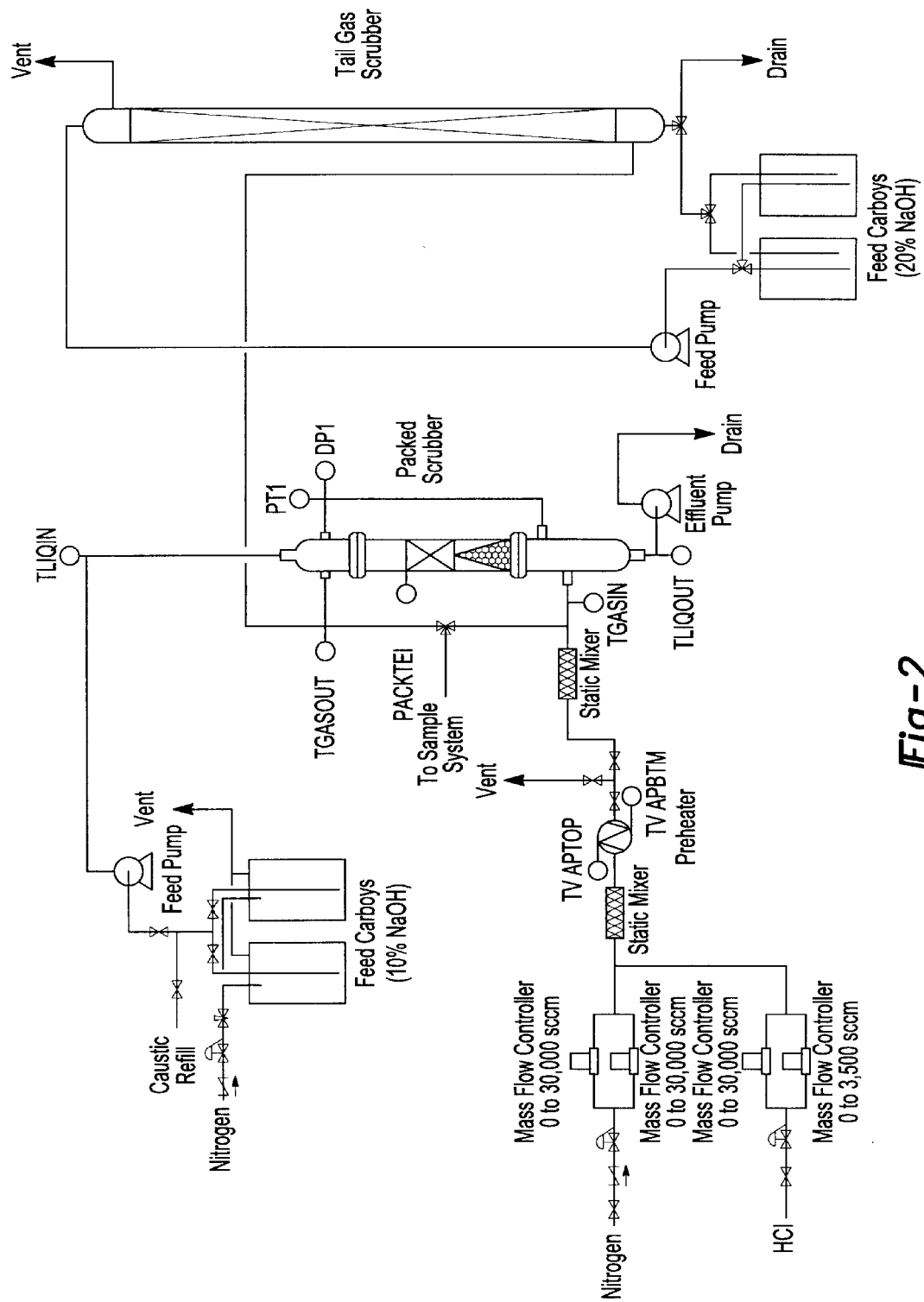
FIG. 2 illustrates a comparative apparatus comprised of two countercurrent reactive gas absorbing units as described in Comparative Example 1.

The comparative apparatus referred to in Comparative Example 1 is illustrated in FIG. 2.

In summary, in separate experiments a first tower (labeled Packed Scrubber in FIG. 2) having a 5.08 cm diameter is packed with 0.635 cm diameter ceramic saddles (not labeled) to form one segment of packing material (not labeled) having a known height of from 7.6 cm to 91 cm. The packing segment (not labeled) is used to absorb a reactive gas consisting essentially of hydrogen chloride (HCl) gas and nitrogen gas by a first absorbing liquid that consists essentially of 10% by weight of NaOH in water (10% aqNaOH), wherein the reactive gas and aqNaOH are fed countercurrently through the Packed Scrubber. In separate experiments, reactive gases containing increasing concentrations of HCl in nitrogen gas are absorbed across the packing segment (not labeled) to produce meaningful data for absorption performance evaluation for the reactive gas (also known as a rich gas). When feeding a reactive gas consisting essentially of 90 mole % HCl and nitrogen gases to the packing segment (not labeled), 98.4% by weight of the HCl is absorbed within a short distance up the height of the packing segment (i.e., within a 7.6 cm height of the packing segment). Based on teachings of the scrubber art, one would have expected to need multiple 7.6 cm height packing segments to absorb the absolute amount of HCl that is absorbed within the 7.6 cm height of the packing segment.

In particular, referring to FIG. 2, a back-venting fume hood (not shown) contains an apparatus system comprising the 5.08 cm diameter first tower (labeled Packed Scrubber in FIG. 2) that is made of 15.2 cm and/or 30.5 cm height sections of 5.08 cm inner diameter flanged glass pipe (not labeled). In separate experiments, the Packed Scrubber is alternatively packed with 0.61 cm diameter ceramic saddles (not labeled) from a minimum height of 7.6 cm to a maximum height of 91 cm. A vent (labeled TGASOUT in FIG. 2) from the Packed Scrubber is connected to a second tower (labeled Tail Gas Scrubber in FIG. 2) that is packed with additional 0.61 cm ceramic saddles (not labeled) to a consistent height of 91 cm. The Tail-Gas Scrubber is used for safety and environmental reasons to absorb any unabsorbed gas containing HCl that is not absorbed in the Packed Scrubber before the unabsorbed gas is vented out of the Tail-Gas Scrubber to the back of the fume hood and, then to atmosphere. Brooks mass flow meters and controllers (not labeled) are used to control and monitor flow rates of the reactive gas into the Packed Scrubber and allow calculation of HCl concentration in the reactive gas. A first Kynar static mixer (Koflo Corporation, Cary, Ill., USA; labeled Static Mixer between Mean Flow Controllers and Heater in FIG. 2) is installed at the gas inlet TGASIN (see FIG. 2) of the Packed Scrubber to form the reactive gas by mixing the HCl gas (labeled HCl in FIG. 2) and nitrogen gas (labeled Nitrogen before Mean Flow Controller in FIG. 2), which is obtained from a plant nitrogen system (not shown) or a gas cylinder (not shown) via a feed line (not labeled), before the resulting reactive gas is heated to 25° C. and fed through a second Kynar static mixer (labeled Static Mixer between Heater and TGASIN in FIG. 2) to TGASIN (see FIG. 2) at the bottom of the Packed Scrubber. A gas heater (labeled Heater in FIG. 2), made of a one liter sample bomb made of 316 stainless steel (not labeled) and wrapped with heat tape (not labeled), is disposed in the reactive gas feed line (not labeled) to the Packed Scrubber to heat the reactive gas to a desired temperature. Amitherm insulation tape (not labeled) is wrapped over the heat tape (not labeled) to reduce heat loss from the HEATER (see FIG. 2). A resistance temperature device (RTD, not indicated) is used to monitor the heat tape temperature for temperature control. A check valve (not labeled) is installed in the plant nitrogen feed line (not labeled) to prevent any backflow of HCl into the plant nitrogen system (not shown). Temperature of the reactive gas at the gas inlet TGASIN and temperature of unabsorbed gas at the gas outlet TGASOUT of the Packed Scrubber are measured using RTDs (not labeled). Temperature of the 10% aqNaOH is measured at the liquid inlet TLIQIN and outlet TLIQOUT of the Packed Scrubber using RTDs (not labeled). In some embodiments, a Sample System (see FIG. 3; see FIG. 2 for connection point thereto) alternatively measures temperature and concentration of a sample of the reactive gas drawn before TGASIN and/or a sample of unabsorbed gas drawn from TGASOUT. Digital pumps (Cole-Palmer, a first Feed Pump that is labeled Feed Pump (between first Feed Carboys and TLIQIN) and an Effluent Pump is labeled Effluent Pump in FIG. 2) equipped with polytetrafluoroethylene (PTFE) diaphragm pump heads are respectively used to pump the 10% aqNaOH first absorbing liquid into the liquid inlet TLIQIN at the top, and out the outlet TLIQOUT at the bottom, of the Packed Scrubber and a second digital pump (a second Feed Pump that is labeled Feed Pump between second Feed Carboys and Tail-Gas Scrubber in FIG. 2) is used to separately pump a second absorbing liquid consisting essentially of 20% by weight aqNaOH (20% aqNaOH) from second Feed Carboys (under Tail-Gas Scrubber) into the top (not labeled) and out the bottom (not labeled) of the Tail-Gas Scrubber to Drain. Operating pressure and pressure drop in the Packed Scrubber, inlet and outlet temperatures of the reactive gas and unabsorbed gas respectively to and from the Packed Scrubber, and the inlet and outlet temperatures of the 10% aqNaOH to and from the Packed Scrubber are monitored by a CAMILE TG data acquisition and control system (not indicated). The temperature of the reactive gas is measured using a RTD (not labeled) located at the entrance TGASIN to the Packed Scrubber. The temperature of the unabsorbed gas leaving the Packed Scrubber is also measured by a RTD (not indicated) located at TGASOUT. Gas flow controllers (not labeled) and the first and second Feed Pumps and the Effluent Pump are controlled from a field location (not indicated). Operating pressure for the Packed Scrubber is measured using a pressure transmitter (not labeled) with a tantalum diaphragm located at the top of the Packed Scrubber. Pressure drop across the Packed Scrubber is measured using a differential pressure transmitter (not labeled). The first absorbing liquid 10% aqNaOH is fed to the Packed Scrubber in a one-pass mode. The second absorbing liquid 20% aqNaOH solution is re-circulated through the Tail-Gas Scrubber to absorb any unabsorbed HCl not absorbed in the Packed Scrubber. The 10% and 20% aqNaOH solutions at the desired concentrations are ordered directly from Fisher Scientific. The 10% aqNaOH is pumped using a variable speed, digital diaphragm first Feed Pump (labeled Feed Pump between first Feed Carboys and TLIQIN in FIG. 2) from 18.9-liter first Feed Carboys (see above) and fed to the top of the Packed Scrubber via TLIQIN. A flow rate of the 10% aqNaOH is controlled by setting the speed (revolutions per minute or rpm) of the first Feed Pump. A desired rpm of the first Feed Pump is obtained from a pump calibration curve generated by timing a given amount of 10% aqNaOH delivered by the first Feed Pump at various rpm settings. The temperature of the 10% aqNaOH feed is monitored by a RTD (not labeled) located at the liquid feed entrance TLIQIN to the top of the Packed Scrubber. A second digital PTFE diaphragm Effluent Pump is used to pump a bottom-collected aqueous NaOH out of the Packed Scrubber via TLIQOUT (see FIG. 2) and the rpm of the Effluent Pump is set to maintain a constant level of the bottom-collected aqNaOH in the bottom of the Packed Scrubber. The exit temperature of the bottom-collected aqNaOH is monitored using a RTD (not labeled) located at the liquid outlet TLIQOUT from the Packed Scrubber. The 20% aqNaOH is fed from two 18.9-liter second carboys (see above discussion) to top of the Tail-Gas Scrubber using the digital PTFE diaphragm second Feed Pump. The 20% aqNaOH enters the top of the Tail-Gas Scrubber and leaves the bottom of the Tail-Gas Scrubber and is re-circulated back to the second Feed Carboys. The feed flow rate of the 20% aqNaOH is controlled by setting the rpm of the digital second Feed Pump.

Process Sampling.

Again referring to FIG. 2, sample ports (not labeled) are provided at the entrance TGASIN of the Packed Scrubber and the vent TGASOUT of the Packed Scrubber. Sampling is carried out by pulling a slipstream from the sampling port by a Sample System comprising a diaphragm vacuum pump through a series of impingers, i.e., impinger train, which Sample System is illustrated in FIG. 3.

Figure 3:
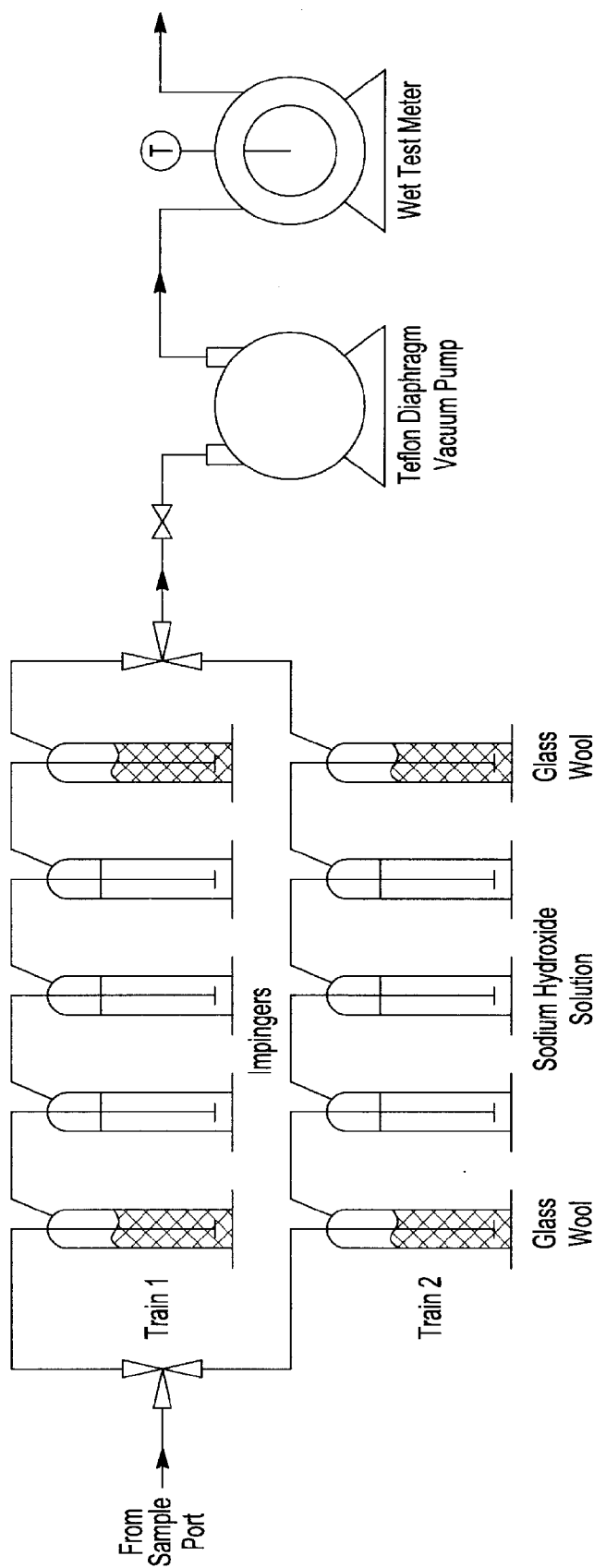
FIG. 3 illustrates an arrangement of impingers for trapping for quantification an unabsorbed amount of a reactive gas.

Referring to FIG. 3, the impingers are filled with about 250 mL of either a 0.1 Normal (N) or 0.5 N standardized sodium hydroxide solution. The sampled gas is pulled through the impinger train at a rate of about 1 to 2 liters per minute. Each sampling is carried out for from 15 to 45 minutes, depending on the nature of the sample, to ensure that enough HCl is absorbed in the excess sodium hydroxide solution in the impingers. The total volume of sampled gas pulled through the impinger train is measured using a Wet Test Meter (see FIG. 3). The HCl concentrations in the excess sodium hydroxide solution are determined by back titration with standardized aqueous HCl solution using phenolphthalein, which turns from pink to colorless at the endpoint. The HCl concentrations in the impingers are related back to the HCl concentrations in the inlet and outlet streams of the Packed Scrubber using the volume of gas sample measured by the Wet Test Meter for each. Unabsorbed gas at TGASOUT contains water vapor taken from the first absorbing liquid. Calculate and report HCl concentration of the unabsorbed gas on a water-free basis, i.e., after correcting for water, using temperature of water-wet residual nitrogen gas at the Wet Test Meter and assuming that the water-wet residual nitrogen gas at Wet Test Meter is saturated with water. Base assumption on observation that the unabsorbed gas at TGASOUT contains a lot of water vapor and temperature of the unabsorbed gas at TGASOUT is higher than the temperature of the water-wet residual nitrogen gas at the Wet Test Meter, demonstrating heat loss, which would naturally lower saturation point for water vapor in nitrogen gas. The results of the experiments can be viewed below in Table 1. Seven experiments are carried out, varying the concentration of the reactive gas from 5 mole % HCl in nitrogen into the inlet TGASIN to 90 mole % HCl in nitrogen. The experiment conducted at 10 mole % HCl in nitrogen is carried out three times. All of the experiments are performed with 10% aqNaOH flowing through the Packed Scrubber and conducted such that there is always an excess of 10% aqNaOH over stoichiometric requirements for reaction of HCl and NaOH. Calculate HCl concentration in the reactive gas with Mass Flow Controllers (see above discussion); measure HCl concentration in unabsorbed gas from TGASOUT using the Sample System (see FIG. 3); measure reactive gas feed rate (i.e., flow rate) in standard cubic centimeters per minute (sccm) with Gas Flow Controllers (see above discussion); measure feed rate (i.e., flow rate) of first absorbing liquid entering TLIQIN; and calculate percent of HCl in reactive gas that is absorbed by Packed Scrubber.

TABLE 1

Results for the Absorption of HCl in 10% aqNaOH

| HCl concentration in reactive gas entering TGASIN (mole %) | HCl concentration in unabsorbed gas from TGASOUT (mole %) | Reactive Gas Feed Rate (sccm) | First Absorbing Liquid (10% aqNaOH) Feed Rate (mL/min.) | Percent Absorption of HCl |
|---|---|---|---|---|
| 5 | 0.0429 | 26,463 | 550 | 99.1 |
| 10 | 0.0311 | 26,068 | 550 | 99.7 |
| 10 | 0.1376 | 26,068 | 550 | 98.6 |
| 10 | 0.1775 | 26,068 | 550 | 98.2 |
| 25 | 0.3593 | 25,680 | 550 | 98.6 |
| 50 | 0.8857 | 24,840 | 550 | 98.2 |
| 75 | 0.6560 | 24,090 | 550 | 99.1 |
| 90 | 1.4088 | 23,640 | 550 | 98.4 |

Figure 4:
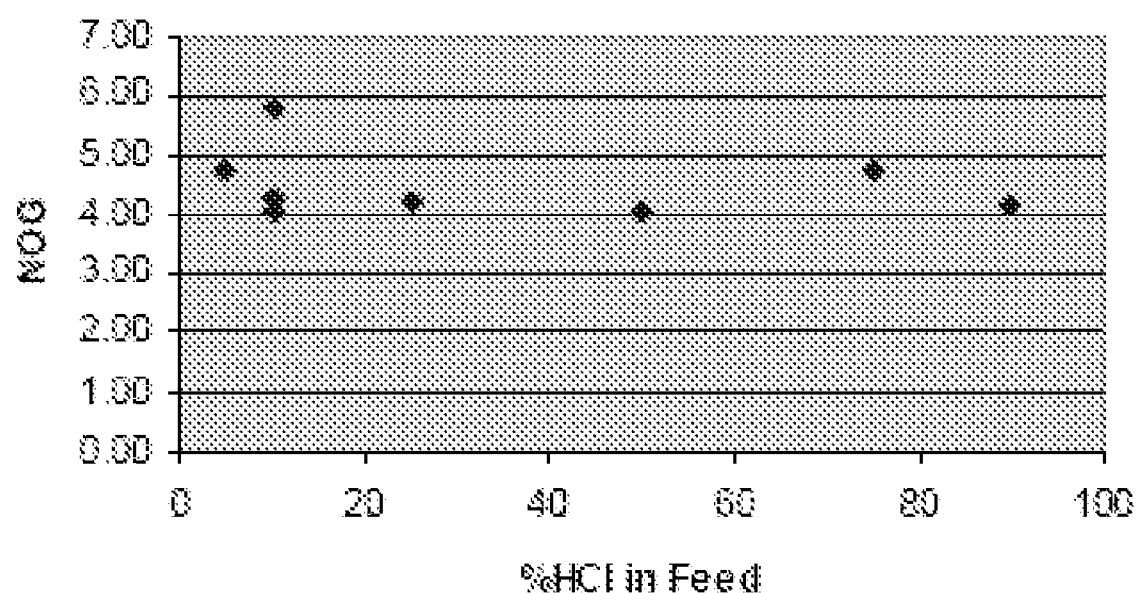
FIG. 4 graphically depicts a number of transfer units calculated from experimental data for mixtures of HCl gas at different concentrations in nitrogen gas that are fed to the comparative apparatus of Comparative Example 1.

FIG. 4 summarizes the number of transfer units calculated from the experimental data for each of the cases. The average number of transfer units (NOG) is approximately 4.5 across a 15.2 cm height of packing material. This NOG equates to a height of a transfer unit of approximately 3.3 cm. As can be seen in FIG. 4, the transfer units are strikingly consistent across a very wide range of feed concentrations.

The experimental data in Comparative Example 1 demonstrate a discovery that a reactive gas is efficiently absorbed in counter-current flow mode within a 15.2 cm height of a packing segment, whereas the scrubber art teaches that multiple 15.2 cm height packing segments would be required to absorb in counter-current flow mode the absolute amount of HCl that is absorbed within the 15.2 cm height of the packing segment.

Thus from the discovery of Comparative Example 1 it is concluded that, in accordance with a preferred process of the second embodiment, a major portion of the reactive gas would be absorbed in the co-current absorbing unit that comprises the invention apparatus of the first embodiment. This conclusion is validated as described later in Example 2. Further, a unique characteristic of a co-current absorbing unit is that it cannot be hydraulically flooded by the reactive gas. Thus, the invention apparatus is comprised of two absorbing units, a co-current absorbing unit followed in series by a countercurrent absorbing unit. The discovery allows sizes of packed beds (comprised of one or more packing segments) in the invention absorbing units to be less than half the sizes of packed beds in corresponding conventional units for a given capacity and, preferably the invention apparatus is not hydraulically flooded by the reactive gas during an invention process.

COMPARATIVE EXAMPLE 2

Employ the comparative apparatus of Comparative Example 1 and FIG. 2. Quench a reactive gas consisting of either 50 mole percent (mol %) hydrogen chloride (HCl) gas in nitrogen gas with a first absorbing liquid that is 10% aqNaOH in counter-current flow such that the NaOH is in stoichiometric excess compared to the HCl gas. Measure HCl concentration in reactive gas using Mass Flow Controllers (see discussion in Comparative Example 1), measure (operating) reactive gas pressure at TGASIN (see FIG. 2), measure temperature of unabsorbed gas from TGASOUT (see FIG. 2), measure temperature of absorbing liquid effluent from TLIQOUT (see FIG. 2), measure at Wet Test Meter (see FIG. 3) of Sample System (see FIG. 3) temperature of residual HCl-free, water-wet nitrogen gas, from removal of HCl from unabsorbed gas by impingers (see FIG. 3), and measure HCl concentration in unabsorbed gas from TGASOUT (see FIG. 2). Repeat one time to give Comparative Examples 2a and 2b. The results are shown below in Table 2.

99.9% by weight of the amount of a reactive gas released from the reactive gas source 8 is absorbed by a first absorbing liquid 12 and a second absorbing liquid (not shown) at the first packed bed 15 and second packed bed 25, respectively, without hydraulically flooding the first and second packed beds 15 and 25. Sizes of first and second packed beds 15 and 25 are each less than half the sizes of packed beds in corresponding conventional units for the same anticipated amount of the reactive.

Example 2

Figure 5:
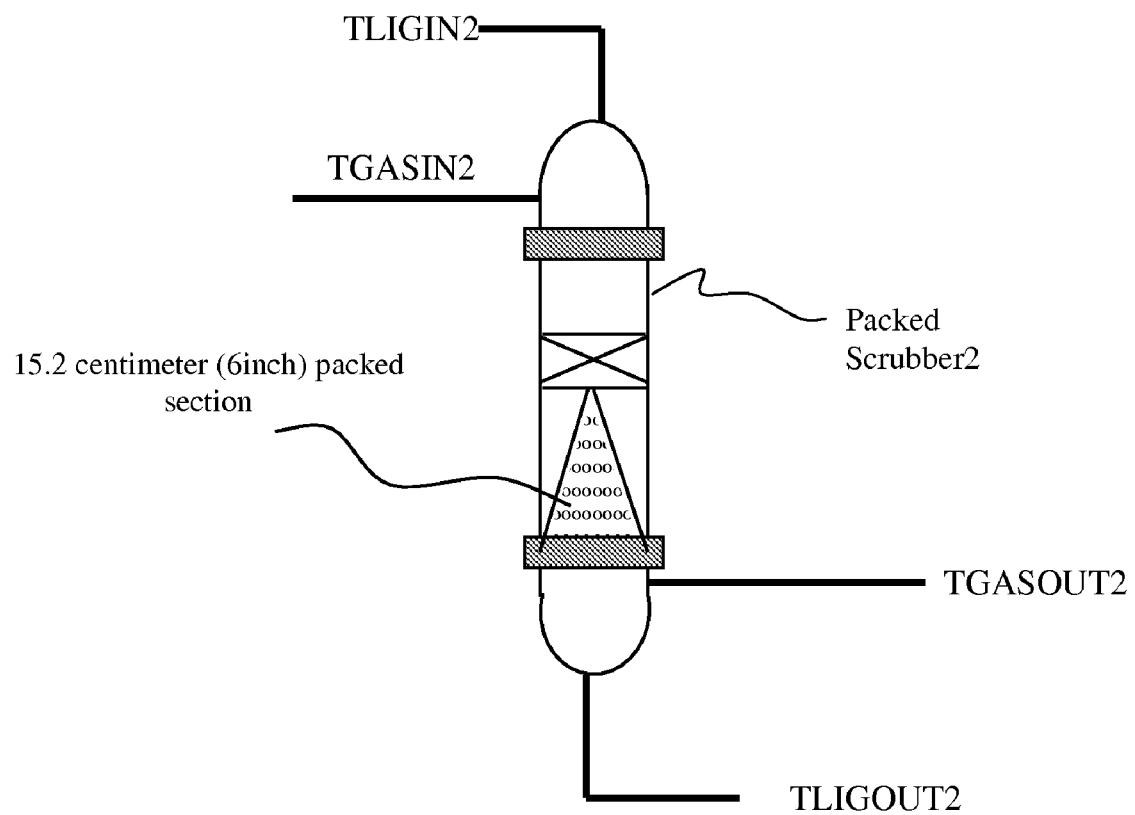
FIG. 5 illustrates a co-current reactive gas absorbing unit that comprises the invention apparatus described in Example 2.

Laboratory-scale Rich Gas Absorption Apparatus Comprising a Co-current Packed Bed First Tower and Countercurrent Packed Bed Second Tower Repeat the process of Comparative Example 2 described above except with TGASIN and TGASOUT of the Packed Scrubber of FIG. 2 reconfigured for co-current flow of the reactive gas. Maintain the same configuration for absorbing liquid inlet and outlet, TLIQIN and TLIQOUT (see FIG. 2) Thus, use a modified apparatus that is the same as the apparatus of FIG. 2 except the TGASIN and TGASOUT (see FIG. 2) connections of the Packed Scrubber of FIG. 2 are modified as depicted in FIG. 5 and as described by the following steps:

(a) Disconnect the Static Mixer (see FIG. 2) from TGASIN (see FIG. 2) and relabel TGASIN (see FIG. 2) as TGASOUT2 (see FIG. 5);

(b) Connect the disconnected Static Mixer of step (a) to TGASOUT (see FIG. 2) and relabel TGASOUT (see FIG. 2) as TGASIN2 (see FIG. 5);

(c) relabel TLIQIN (see FIG. 2) and TLIQOUT (see FIG. 2) as TLIQIN2 (see FIG. 5) and TLIQOUT2 (see FIG. 5), respectively; and (d) relabel Packed Scrubber (see FIG. 2) as Packed Scrubber2 (see FIG. 5).

As in Comparative Example 2, the reactive gas consists essentially of HCl gas and nitrogen gas and the first absorbing

TABLE 2

Results of Comparative Example 2

| Comp. Ex. No. | Conc. (mole %) of HCl in Reactive Gas entering TGASIN | Operating Reactive Gas Pressure (mm Hg) at TGASIN | Temp. (° C.) of Unabsorbed Gas From TGASOUT | Temp. (° C.) of Absorbing Liquid From TLIQOUT | Temp. (° C.) of Reactive Gas at Wet Test Meter (FIG. 3) | Conc. (mole %) of HCl in unabsorbed gas from TGASOUT | Mode |
|---|---|---|---|---|---|---|---|
| 2a | 50 | 746.2 | 24.4 | 50.5 | 17.0 | 0.0534 | Countercurrent |
| 2b | 50 | 749.5 | 20.7 | 48.7 | 18.5 | 0.0359 | Countercurrent |

Use the results from Comparative Example 2 for comparison with results from the invention apparatus of Example 2 described later. Preferred embodiments of the invention apparatus and process are described below in Examples 1 and 2.

EXAMPLES OF THE PRESENT INVENTION

Example 1

Manufacturing-scale Rich Gas Absorption Apparatus Comprising a Co-current Packed Bed First Tower and Countercurrent Packed Bed Second Tower A rich gas absorption apparatus as illustrated in FIG. 1 is assembled. An amount of a reactive gas (not shown) is accidentally released from the reactive gas source 8. More than liquid is 10% aqNaOH such that the NaOH is in stoichiometric excess compared to the HCl gas. Route the reactive gas to TGASIN2 (see FIG. 5) at the top of the Packed Scrubber2 (see FIG. 5) instead of to TGASIN (see FIG. 2) at the bottom of the Packed Scrubber in FIG. 2 and remove unabsorbed gas from TGASOUT2 (see FIG. 5) at the bottom of the Packed Scrubber2 (see FIG. 5) instead of from TGASOUT (see FIG. 2) at the top of the Packed Scrubber in FIG. 2. Measure HCl concentration in reactive gas using Mass Flow Controllers (see discussion in Comparative Example 1), measure (operating) reactive gas pressure at TGASIN2 (see FIG. 5), measure temperature of unabsorbed gas from TGASOUT2 (see FIG. 5), measure temperature of absorbing liquid effluent from TLIQOUT2 (see FIG. 5), measure at Wet Test Meter (see FIG. 3) of Sample System (see FIG. 3) temperature of residual HCl-free, water-wet nitrogen gas, from removal of HCl from unabsorbed gas by impingers (see FIG. 3), and measure HCl concentration in unabsorbed gas from TGAS-OUT2 (see FIG. 5). Thus quench a reactive gas consisting of either 50 mole percent (mol %) or 75 mol % hydrogen chloride (HCl) gas in nitrogen gas with the 10% aqNaOH in co-current flow such that the NaOH is in stoichiometric excess. Repeat four times to produce Examples 2a, 2b, 2c, 2d, and 2e. The results are shown below in Table 3.

ating in a co-current mode would flood at significantly higher reactive gas concentrations (e.g., greater than or equal to 1.5 times, increasingly preferably greater than or equal to 2, 3, 5, or 10 times) than reactive gas concentrations that would flood packing sections of packed towers in a counter-current absorbing unit operating in counter-current mode under otherwise analogous conditions means that the present invention is especially useful in the commercial reactive gas scrubbing applications described previously.

TABLE

Results of Example 2

| Example No. | Conc. (mole %) of HCl in Reactive Gas entering TGASIN | Operating Reactive Gas Pressure (mm Hg) at TGASIN | Temp. (° C.) of Unabsorbed Gas From TGASOUT | Temp. (° C.) of Absorbing Liquid From TLIQOUT | Temp. (° C.) of Reactive Gas at Wet Test Meter (FIG. 3) | Conc. (mole %) of HCl in unabsorbed gas from TGASOUT | Mode |
|---|---|---|---|---|---|---|---|
| 2a | 50 | 742.4 | 53.9 | 53.0 | 20.3 | 0.0271 | Co-current |
| 2b | 50 | 742.9 | 46.9 | 47.3 | 20.1 | 0.0452 | Co-current |
| 2c | 50 | 746.2 | 52.5 | 49.4 | 18.8 | 0.0449 | Co-current |
| 2d | 75 | 743.2 | 52.5 | 57.9 | 18.4 | 0.0448 | Co-current |
| 2e | 75 | 741.4 | 52.2 | 56.7 | 19.9 | 0.0542 | Co-current |

As shown by comparing the HCl concentration data for the first to third entries in Table 3 to those data in Table 2, the HCl concentrations of the reactive gases in Examples 2a, 2b, and 2c and Comparative Example 2 is 50 mole % HCl. Both the co-current flow mode of Examples 2a-2c and the counter-current flow mode of Comparative Example 2 reduce HCl concentration in the unabsorbed gases in Comparative Example 2 and Examples 2a-2c to essentially the same concentration values. Contrary to expectations, there is found essentially no difference in scrubbing effectiveness between counter-current and co-current flow modes in Comparative Example 2 and Examples 2a-2c, respectively. Further, as shown by comparing the HCl concentration data for the fourth and fifth entries in Table 3 to those data in Table 2, co-current flow mode of Examples 2d and 2e reduces HCl concentrations in the unabsorbed gases in Examples 2d and 2e to essentially the same concentration values as the counter-current flow mode of Comparative Example 2 reduces HCl concentrations in the unabsorbed gases in Comparative Example 2 even though reactive gas concentrations in Examples 2d and 2e are 75 mole % HCl (co-current flow mode) and reactive gas concentrations in Comparative Example 2 are only 50 mole % HCl. Thus, amounts of a reactive gas in a rich gas stream can be reduced in a relatively short packing in a co-current absorbing unit operating in a co-current mode compared to packing that would be required for a counter-current absorbing unit operating in counter-current mode.

Consequently, sizes of subsequent counter-current sections can be substantially reduced (e.g., by 50% or more) compared to what has heretofore been used in the art (see previous discussion). Such size reduction would allow the counter-current absorbing units to operate in a much improved regime since a great majority of the reactive gas would be removed by the co-current absorbing unit before it would enter the counter-current absorbing unit. This discovery, combined with the knowledge in the art that packing sections of packed towers in a co-current absorbing unit oper- All references herein to the Periodic Table of the Elements shall refer to the Periodic Table of the Elements published and copyrighted by CRC Press, Inc., 2003. Also, any references to a Group or Groups of elements shall be to the Group or Groups reflected in this Periodic Table of the Elements using the IUPAC system for numbering groups disclosed in, *Nomenclature of Inorganic Chemistry: Recommendations 1990*, G. J. Leigh, Editor, Blackwell Scientific Publications (1990).

All elements and limitations comprising any embodiment of the invention may be independently selected. All journal articles, text books, patents, published patent applications, and unpublished patent applications referenced herein are hereby incorporated by reference in their entireties for any and all purposes.

Illustrative embodiments of the invention are described herein. One of ordinary skill in the art (artisan) would know that supportable changes and modifications may be made to these embodiments without departing from the metes and bounds of the invention as described or claimed herein. Supportable changes and modifications include substituting the phrase "consisting essentially of" or the phrase "consisting of" for any or all occurrences of the term "comprising" used in the description, including the claims, in order to negative any and all such unsupportable changes or modifications.

What is claimed is:
1. An apparatus consisting of two absorbing units, wherein:
 (a) a first co-current absorbing unit comprising:
  (i) a first packed bed, which is in selective fluid communication with a source of a first absorbing liquid;
  (ii) a first sealed housing, which contains the first packed bed;
  (iii) a rich gas inlet, which traverses the first sealed housing and is in fluid communication with the first packed bed and is in selective fluid communication with a source of a reactive gas; and
  (iv) an unabsorbed gas outlet, which traverses the first sealed housing and is in fluid communication with the first packed bed;

(b) a second countercurrent absorbing unit comprising:
  (i) a second packed bed;
  (ii) a second sealed housing, which contains the second packed bed;
  (iii) an unabsorbed gas inlet, which traverses the second sealed housing and is in fluid communication with the unabsorbed gas outlet and the second packed bed;
  (iv) a clean gas outlet, which traverses the second sealed housing and is in fluid communication with the second packed bed and is in selective fluid communication with earth's atmosphere;
  (v) a second absorbing liquid inlet, which traverses the second sealed housing and is in fluid communication with the second packed bed and is in selective fluid communication with a source of a second absorbing liquid; and
  (vi) a second absorbing liquid outlet, which traverses the second sealed housing and is in fluid communication with the second packed bed and the first absorbing liquid inlet, or is in fluid communication with the second packed bed and is in selective fluid communication with an absorbing liquid reservoir or a waste liquid conduit;
(c) a first absorbing liquid reservoir comprising:
  (i) a first sealed tank;
  (ii) a first optionally-valved absorbing liquid outlet, which traverses the first sealed tank and is in fluid communication with the first absorbing liquid inlet; and
  (iii) a first pressure-adjusting gas inlet, which traverses the first sealed tank and is in selective fluid communication with a first pressure-adjusting gas source; and
(d) a first liquid transferring means, which is in fluid communication with the first optionally-valved absorbing liquid outlet and the first absorbing liquid inlet;
wherein, optionally, the first and second sealed housings are in direct communication with each other and comprise one contiguous housing comprised of the first and second sealed housings wherein the first co-current absorbing unit is located serially with and is followed by the second countercurrent absorbing unit.

2. The apparatus according to claim 1, wherein the co-current absorbing unit further comprises a partition, which is in communication with the first sealed housing and the first packed bed and enhances a co-current flow of the reactive gas and the first absorbing liquid through the first packed bed.

3. The apparatus according to claim 1, wherein the co-current absorbing unit further comprises a second absorbing liquid inlet and a second absorbing liquid outlet, each of which traverses the first sealed housing and is in fluid communication with the first packed bed, wherein the second absorbing liquid inlet is in fluid communication with the second absorbing liquid outlet or the second absorbing liquid inlet is in selective fluid communication with the source of the first absorbing liquid; and the second absorbing liquid outlet is in fluid communication with the second absorbing liquid inlet or the second absorbing liquid outlet is in selective fluid communication with a waste liquid conduit.

4. The apparatus according to claim 3, the apparatus further comprising a second absorbing liquid reservoir comprising:
  (i) a second sealed tank;
  (ii) a second optionally-valved absorbing liquid outlet, which traverses the second sealed tank and is in fluid communication with the second absorbing liquid inlet;
  (iii) a second pressure-adjusting gas inlet, which traverses the second sealed tank and is in selective fluid communication with a second pressure-adjusting gas source; and
  (iv) optionally, a third absorbing liquid inlet, which traverses the second sealed tank and is in fluid communication with the second absorbing liquid outlet or is in selective fluid communication with the source of the first absorbing liquid;
  wherein the first and second pressure-adjusting gas sources may be the same or different.

5. The apparatus according to claim 4, the apparatus further comprising a second liquid transferring means, which is in communication with the second optionally-valved absorbing liquid outlet and the second absorbing liquid inlet.

6. The apparatus according to claim 5, the apparatus further comprising a third liquid transferring means, which is in fluid communication with the second absorbing liquid outlet and either the second absorbing liquid inlet or the third absorbing liquid inlet; or is in fluid communication with the second absorbing liquid outlet and is in selective fluid communication with an optional first waste liquid conduit, wherein the second and third liquid transferring means may be the same or different.

7. The apparatus according to claim 6, the apparatus further comprising a fourth liquid transferring means, which is in fluid communication with the first absorbing liquid outlet and either the first absorbing liquid inlet or an optional second waste liquid conduit, wherein the first and fourth liquid transferring means may be the same or different and the first and second waste liquid conduits may be the same or different.

8. The apparatus according to claim 1, wherein the first absorbing liquid reservoir further comprises a fourth absorbing liquid inlet, which traverses the first sealed tank and is in fluid communication with the first absorbing liquid outlet.

9. The apparatus according to claim 5, wherein there is a first absorbing liquid contained within the first sealed housing and in fluid communication with the first packed bed, or, optionally, there is a first absorbing liquid contained within the second sealed tank and in fluid communication with the first packed bed; and there is a second absorbing liquid contained within the first sealed tank and in fluid communication with the second packed bed, wherein the first and second absorbing liquids may be the same or different, wherein if the first and second absorbing liquids are the same, then independently the first and second absorbing liquid reservoirs may be the same or different and the first and second liquid transferring means may be the same or different.

10. The apparatus according to claim 1, wherein the second sealed housing is positioned over and in direct communication with the first sealed housing and together the first and second sealed housings comprise one contiguous housing.

11. The apparatus according to claim 1, wherein the first sealed housing is not in direct communication with the second sealed housing and the first and second sealed housings do not comprise one contiguous housing.

12. The apparatus according to claim 5, wherein the apparatus does further comprise the second absorbing liquid inlet, the second absorbing liquid outlet, the second absorbing liquid reservoir, and the second liquid transferring means.

13. The apparatus according to claim 1, the apparatus further comprising a sensing means, which is in activating communication with the first liquid transferring means and in selective fluid communication with a source of a reactive gas.

14. The apparatus according to claim 13, wherein the sensing means detects a reactive gas that is comprised of chlorine, hydrogen chloride, ammonia, phosgene, sulfur dioxide, sulfur trioxide, or nitric oxide.

* * * * *